United States Patent [19]
Line

[11] Patent Number: 5,839,323
[45] Date of Patent: Nov. 24, 1998

[54] MOVING GANTRY MACHINE HAVING UPRIGHTS MOVABLE RELATIVE TO EACH OTHER

[75] Inventor: Henri Line, Peymeinade, France

[73] Assignee: Helis S.A., Peymmeinade, France

[21] Appl. No.: 777,396

[22] Filed: Dec. 27, 1996

[30] Foreign Application Priority Data

Dec. 29, 1995 [FR] France .................................. 95 15717

[51] Int. Cl.$^6$ ................................ B23C 1/10; B23Q 1/25
[52] U.S. Cl. ........................ 74/490.07; 408/37; 408/38; 409/202; 409/212
[58] Field of Search .......................... 74/490.07; 408/37, 408/38, 234; 409/202, 212, 235; 901/8, 16; 212/312, 324

[56] References Cited

U.S. PATENT DOCUMENTS

| | | | |
|---|---|---|---|
| 2,476,038 | 7/1949 | Golbert | 212/324 X |
| 3,575,086 | 4/1971 | Davis . | |
| 4,635,342 | 1/1987 | Balding | 409/212 X |
| 4,658,485 | 4/1987 | Yang . | |
| 4,872,417 | 10/1989 | Kuwabara et al. | 901/16 X |
| 5,183,374 | 2/1993 | Line . | |
| 5,375,952 | 12/1994 | Line | 408/234 X |

FOREIGN PATENT DOCUMENTS

| | | |
|---|---|---|
| 2673874 | 9/1992 | France . |
| 397781 | 3/1933 | United Kingdom . |

OTHER PUBLICATIONS

French Search Report dated 28 Apr. 1996.

*Primary Examiner*—Charles A. Marmor
*Assistant Examiner*—Troy Grabow
*Attorney, Agent, or Firm*—Ostrolenk, Faber, Gerb & Soffen, LLP

[57] ABSTRACT

The invention relates to a moving gantry machine having uprights that are movable relative to each other. The uprights are interconnected by a cross-member made up of two cross-member elements suitable for being moved relative to each other in the limit of a given maximum offset Δ in the displacement direction of the uprights. The displacement of the uprights is controlled by respective independent drive systems $X_1$ and $X_2$ under numerical control within the limit of said offset. A third drive system $X_3$ is provided for displacement between the cross-member elements and is under numerical control with the condition the displacement distance of drive system $X_1$+the displacement distance of drive system $X_3$=the displacement distance of drive system $X_2$.

2 Claims, 4 Drawing Sheets

MOVING GANTRY MACHINE HAVING UPRIGHTS MOVABLE RELATIVE TO EACH OTHER

FIELD OF THE INVENTION

The present invention relates to a moving gantry machine used for machining workpieces of large dimensions.

More precisely it relates to a moving gantry machine comprising two uprights standing on a bench via parallel slides defining a longitudinal X axis, the displacement of said uprights along said X axis being controlled by respective drive systems $X_1$ and $X_2$ under numerical control, and a cross-member interconnecting said two uprights, said gantry being capable of carrying machining heads on each upright, which heads are suitable for being displaced along Y and Z axes.

BACKGROUND OF THE INVENTION

FIG. 1 shows a conventional gantry machine 1 comprising two uprights 2 and 3 whose bottom faces rest on a bench 4 via slides 5, 6 parallel to a horizontal axis X, together with a one-piece cross-member 7 rigidly interconnecting the two uprights 2 and 3. The cross-member 7 may be fixed relative to the uprights 2 and 3 or it may be vertically movable. Carriages 8a, 8b, and 8c are mounted to slide along respective 7 axes perpendicular to the X axis on each of the uprights 2 and 3 and on the cross-member 7. The carriages 8a, 8b, and 8c carry respective tool-carrying machining heads 9a, 9b, and 9c capable of being moved along respective Z axes perpendicular to the X and Y axes.

Movement of the gantry 1 is controlled by two drive systems $X_1$ and $X_2$ which are synchronized under numerical control, and which also control displacement of the carriages 8a, 8b, and 8c and of the machining heads 9a, 9b, and 9c as a function of the machining work to be performed on a workpiece mounted on the bed 4a.

In present gantry machines, the cross-member may be fixed relative to the uprights or it may be vertically movable, however the drive systems $X_1$ and $X_2$ are synchronized so as to enable both uprights and the cross-member to move together along the X axis.

The fundamental characteristic of existing gantry machines is that all of the machining heads move together in the longitudinal X direction since they are secured to carriages carried by the gantry. The machining heads are said to have a "common" X axis.

That makes it impossible to follow paths that are very different even when the Y and Z axes are independent.

OBJECT AND SUMMARY OF THE INVENTION

The object of the present invention is to propose a gantry design that makes it possible, at least to some extent, to obtain X axes that are independent for carriages placed on each of the uprights.

The invention is based on the idea of enabling the uprights to be displaced independently of each other in the longitudinal X axis direction without compromising the rigidity of the gantry.

The invention achieves its object by the fact that the cross-member is made up of two cross-member elements carried by respective ones of the uprights and suitable for being moved relative to each other in the X direction within the limit of a given maximum offset Δ; and by the fact that the drive systems $X_1$ and $X_2$ are independent of each other and are under numerical control within the limit of said offset Δ.

The rigidity of the gantry is maintained by very rigid and close guidance between the two elements of the cross-member.

In order to improve the operational accuracy of the assembly, there is advantageously provided in addition to the guidance, an additional drive system $X_3$ between the two elements of the cross-member, each drive system $X_3$ being under numerical control with the condition the displacement distance of drive system $X_1$+the displacement distance of drive system $X_3$=the displacement distance of drive system $X_2$.

This new design makes it possible to obtain totally different paths for two carriages carried by respective ones of the uprights and it can have numerous applications, in particular:

machining two workpieces or two different faces of a single workpiece;

putting a moving cross-member into position in three dimensions to enable a machining head to machine along an axis W that is steerable in three dimensions; and placing a riveting horseshoe in three dimensions.

BRIEF DESCRIPTION OF THE DRAWINGS

Other advantages and characteristics of the invention from reading the following description given by way of example and made with reference to the accompanying drawings, in which.

DETAILED DESCRIPTION OF THE DRAWINGS

Figure 1:
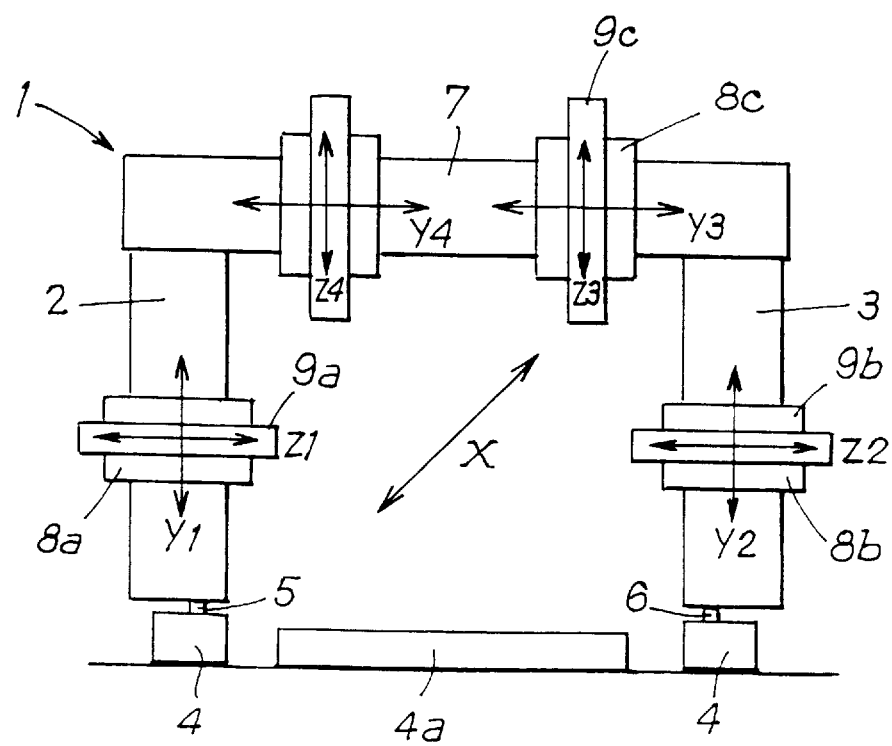
FIG. 1 is an elevation view of a conventional gantry machine.
Figure 2:
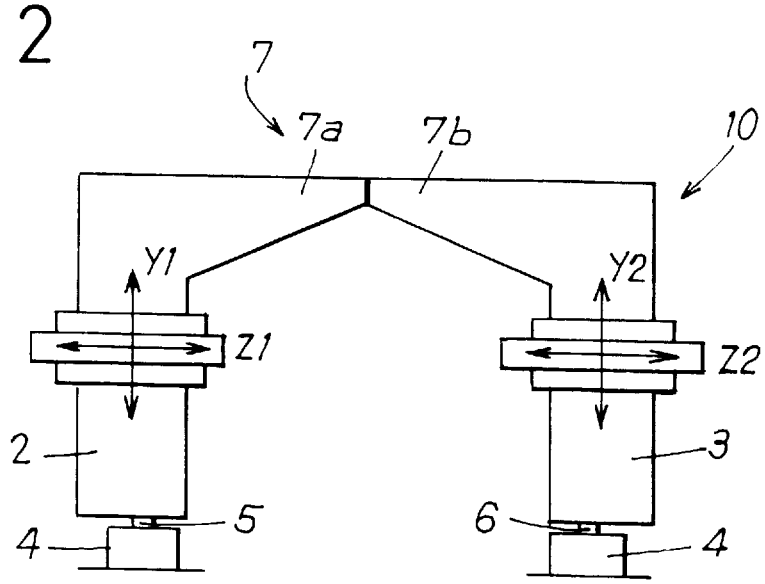
FIG. 2 is an elevation view of a gantry machine of the invention.
Figure 3:
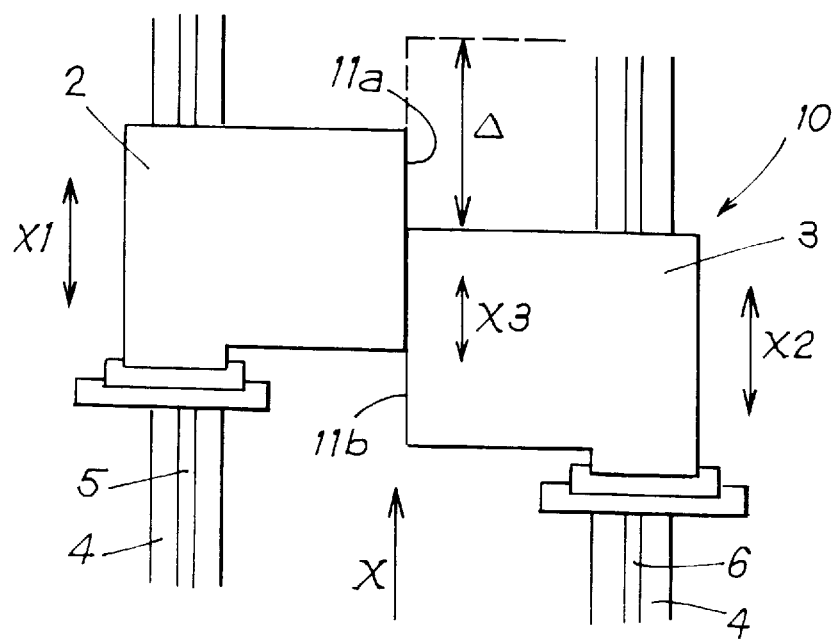
FIG. 3 is a plan view of the FIG. 2 gantry machine.

FIGS. 2 and 3 show a gantry machine 10 of the invention which differs functionally from a conventional machine by the fact that the two uprights 2 and 3 can be displaced along the horizontal axis X independently from each other within limits set by a given maximum offset Δ.

This gantry machine 10 also includes two uprights 2 and 3 whose bottom faces rest on a bench 4 via slides 5 and 6 parallel to a horizontal axis X, together with a cross-member 7 that interconnects the two uprights 2 and 3. The cross-member 7 is made up of two cross-member elements 7a and 7b carried by the uprights 2 and 3 respectively and having facing faces 11a and 11b situated in a vertical join plane parallel to the X direction, which faces are fitted with means in the form of slides parallel to the X axis to provide close and very rigid guidance between the two elements of the cross-members 7a and 7b and maintaining the rigidity of the gantry during relative displacement of the two uprights 2 and 3 along the X axis.

The upright 2 is displaced in the X direction by a drive system $X_1$ under numerical control. The upright 3 is moved independently of the upright 2 by a drive system $X_3$ likewise under numerical control.

Displacement of cross-member element 7a relative to cross-member element 7b can be controlled by an additional drive system $X_3$ under numerical control with the condition the displacement distance of drive system $X_1$+the displacement distance of drive system $X_3$=the displacement distance of drive system $X_2$, thereby making it possible to improve the operating accuracy of the assembly.

The maximum acceptable offset Δ between displacements of the two uprights 2 and 3 along the X axis is a function of the length of the guide means between the cross-member elements 7a and 7b and is no greater than twice the width of the cross-member elements 7a and 7b in the join plane. This offset Δ is preferably no greater than the width of the cross-member elements 7a and 7b so that they remain pressed one against the other via at least one-half of their facing front surfaces.

The gantry machine 10 having mutually displaceable uprights 2 and 3 can have numerous applications.

It can be used in particular for machining two different workpieces or two different faces of the same workpiece. Under such circumstances, the machining heads 9a and 9b carried by the carriages 8a and 8b for sliding on the uprights 2 and 3 are slidable and fitted with tools for milling, drilling, or boring, as shown in FIGS. 2 and 3.

Figure 4:
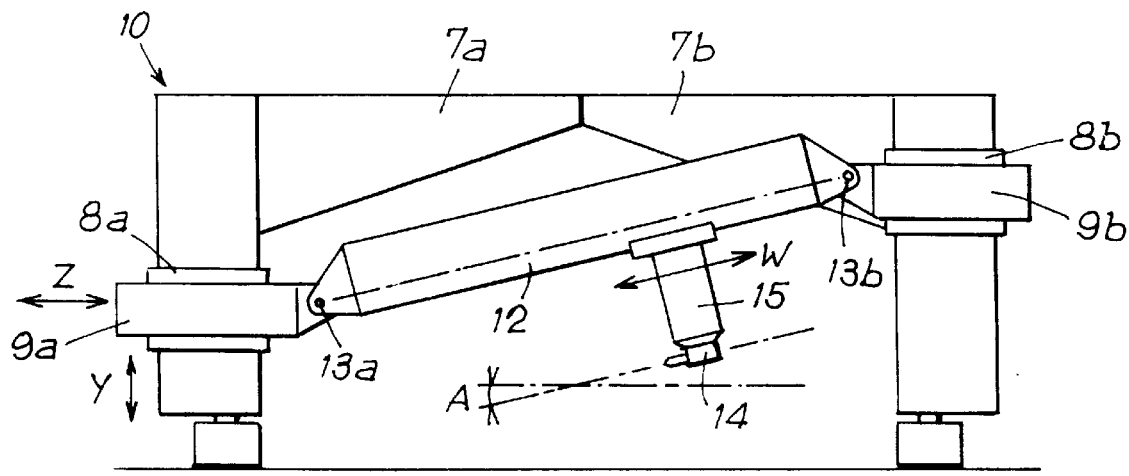
FIG. 4 is an elevation view of a gantry machine of the invention used for putting into position in three dimensions a moving cross-member carrying a machining head.
Figure 5:
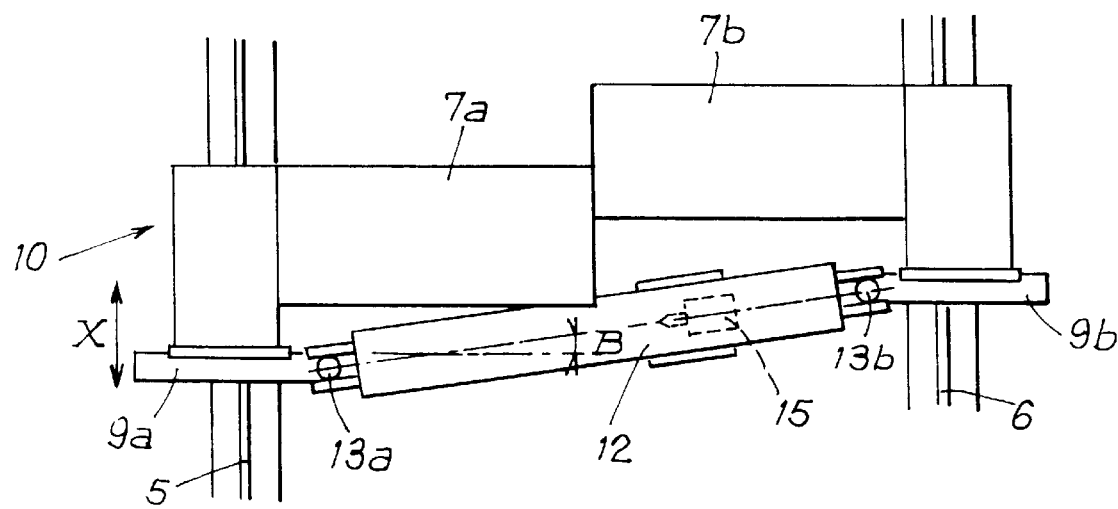
FIG. 5 is a plan view of the FIG. 4 gantry machine.

FIGS. 4 and 5 show use of the gantry 10 of the invention to put a moving cross-member 12 carrying a machining head 13 into position in three dimensions so as to enable machining to be performed along an axis W that is steerable in three dimensions. Each carriage 8a and 8b is fitted with a slide 9a, 9b having a two-pivot coupling 13a, 13b to support the moving cross-member 12. The moving cross-member 12 can be positioned along five axes: the X axis by moving the gantry 1, the Y axis by moving the carriages 8a and 8b vertically, the Z axis by plunging displacement of the slides 9a and 9b, the A axis by rotation in a vertical plane about a horizontal axis perpendicular to the X axis by relative displacement of the carriages 9a and 9b, and the B axis by rotation about a vertical axis by relative displacement of the uprights 2 and 3 of the gantry. If the moving cross-member 12 carries a machining head 14 on a right-angle spindle 15, it is possible to perform drilling or boring type machining operations using a single displacement axis W.

Figure 6:
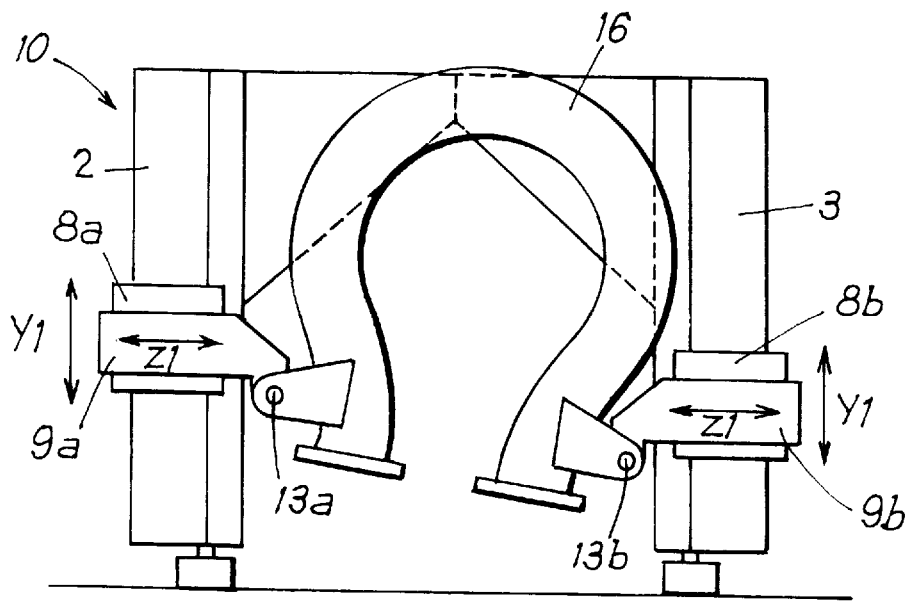
FIG. 6 is an elevation view showing the gantry machine of the invention being used for putting a riveting horseshoe into place in three dimensions.
Figure 7:
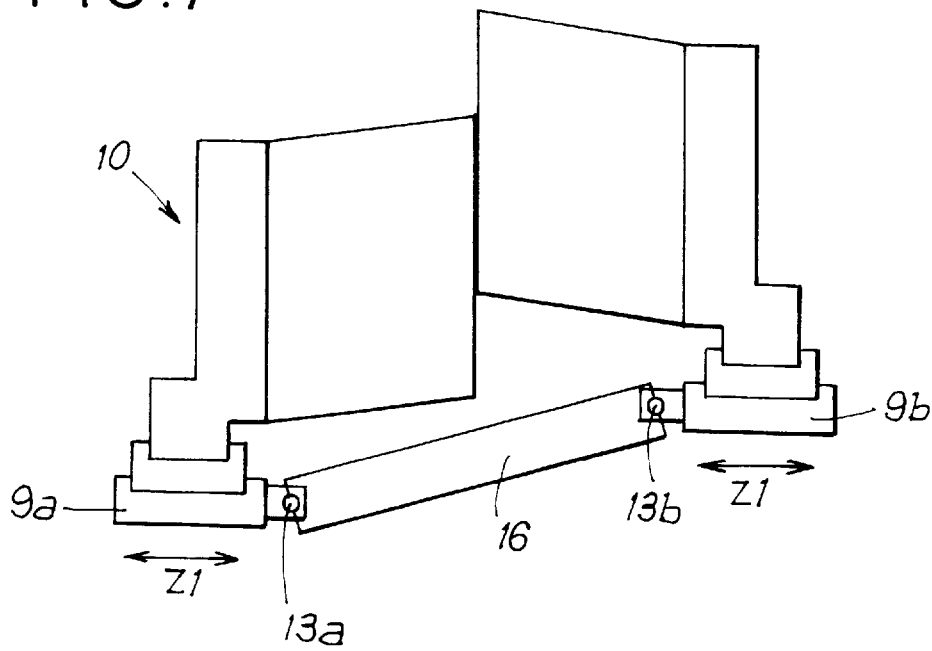
FIG. 7 is a plan view of the FIG. 6 gantry machine.

FIGS. 6 and 7 show the gantry 10 of the invention in use to put a riveting horseshoe 16 into position in three dimensions. As for putting the moving cross-member 12 into position, the riveting horseshoe 16 is connected to the slides 9a and 9b of the carriages 8a and 8b via two-pivot couplings 13a, 13b. The horseshoe can thus be put into position in three dimensions and all kinds of drilling, lapping, boring, screwing, and riveting operations can be performed with great accuracy on a stationary workpiece held securely in a rigid mount beneath the gantry.

I claim:

1. A moving gantry machine comprising two uprights standing on a bench via parallel slides defining a longitudinal X axis, the displacement of said uprights along said X axis being controlled by respective drive systems $X_1$ and $X_2$ under numerical control, and a cross-member interconnecting said two uprights, said gantry being capable of carrying machining heads on each upright, which heads are suitable for being displaced along Y and Z axes, wherein the cross-member is made up of two cross-member elements carried by respective ones of the uprights and suitable for being moved relative to each other in the X direction within the limit of a given maximum offset Δ; and wherein the drive systems $X_1$ and $X_2$ are independent of each other and are under numerical control within the limit of said offset Δ.

2. A machine according to claim 1, wherein an additional drive system $X_3$ is provided between the two cross-member elements, said additional drive systems $X_3$ being under numerical control with the condition the displacement distance of drive system $X_1$+the displacement distance of drive system $X_3$=the displacement distance of drive system $X_2$.

* * * * *